(12) United States Patent
McLeod

(10) Patent No.: US 6,485,641 B1
(45) Date of Patent: Nov. 26, 2002

(54) WATER FILTER CARTRIDGE HAVING A PROPORTIONAL FLOW FEEDER

(75) Inventor: Marcus Donald McLeod, Westmont, IL (US)

(73) Assignee: United States Filter Corporation, Palm Desert, CA (US)

( * ) Notice: Subject to any disclaimer, the term of this patent is extended or adjusted under 35 U.S.C. 154(b) by 69 days.

(21) Appl. No.: 09/694,184

(22) Filed: Oct. 23, 2000

(51) Int. Cl.[7] ............................... C02F 5/08; C02F 9/00
(52) U.S. Cl. ................. 210/198.1; 210/206; 210/209; 210/697; 210/266
(58) Field of Search ...................... 210/206, 209, 210/198.1, 697, 266

(56) References Cited

U.S. PATENT DOCUMENTS

| | | | |
|---|---|---|---|
| 3,357,563 A | * | 12/1967 | Sicard |
| 3,442,800 A | * | 5/1969 | Jasionowski |
| 3,746,171 A | | 7/1973 | Thomsen |
| 4,178,250 A | * | 12/1979 | Turetsky |
| 4,396,512 A | | 8/1983 | Beauman et al. |
| 4,548,227 A | | 10/1985 | Regunathan et al. |
| 4,780,197 A | | 10/1988 | Schuman ............... 210/136 |
| 4,857,189 A | | 8/1989 | Thomsen et al. |
| RE34,031 E | | 8/1992 | Thomsen et al. |
| 5,407,573 A | * | 4/1995 | Hughes |
| 5,552,057 A | * | 9/1996 | Hughes et al. |
| 5,580,448 A | * | 12/1996 | Brandreth III |
| 5,753,107 A | * | 5/1998 | Magnesson et al. |
| 5,897,770 A | | 4/1999 | Hatch et al. ............... 210/101 |
| 5,928,512 A | * | 7/1999 | Hatch et al. |
| 6,027,644 A | * | 2/2000 | Magnesson et al. |
| 6,193,884 B1 | * | 2/2001 | Magnusson et al. |
| 6,325,925 B1 | * | 12/2001 | Hansen |
| 6,325,926 B1 | * | 12/2001 | Hansen |

* cited by examiner

Primary Examiner—Thomas M. Lithgow
(74) Attorney, Agent, or Firm—Greer, Burns & Crain, LTD

(57) ABSTRACT

More specifically, the present invention features an improved feeder tube for a water treatment cartridge that provides treatment by a solid compound for a slipstream of untreated water flowing through the cartridge. The feeder tube includes a first end and a second end, such that the slipstream of water generally flows into the feeder tube at the second end and out of the feeder tube at the first end. A bottom plug assembly is in operational relationship with the second end and includes a porous plug being sized and configured to provide filtration and purification for the slipstream portion of the water.

20 Claims, 3 Drawing Sheets

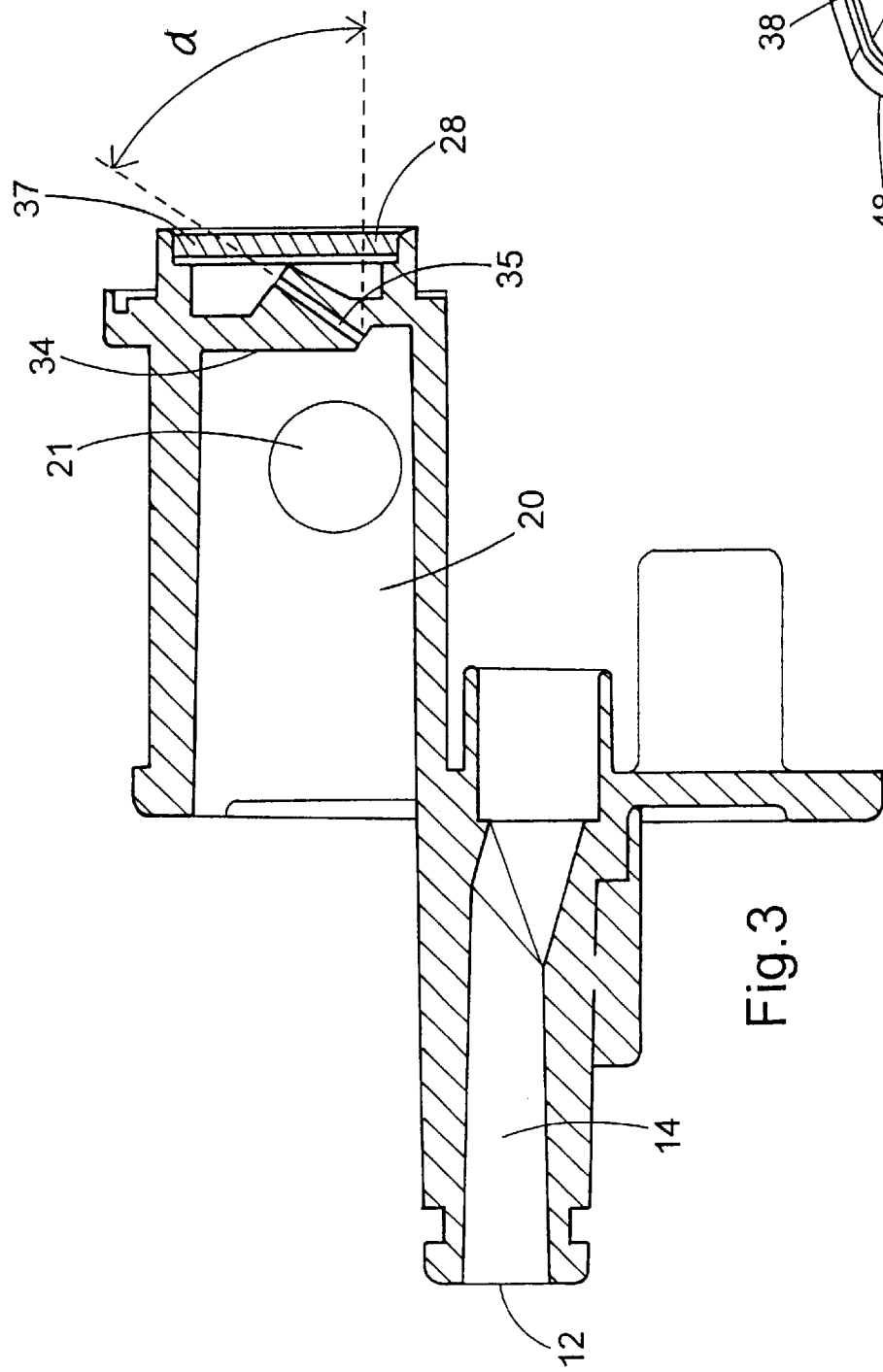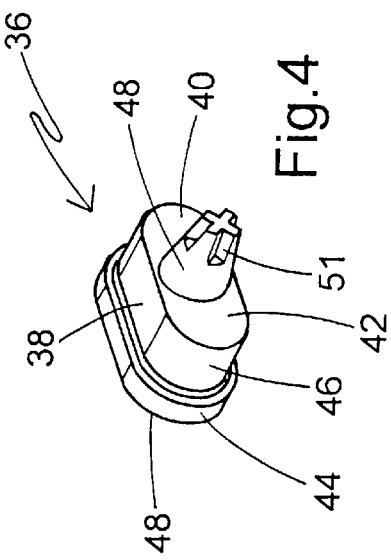

WATER FILTER CARTRIDGE HAVING A PROPORTIONAL FLOW FEEDER

FIELD OF THE INVENTION

This invention relates to filter cartridges for drinking water treatment systems, and more specifically to a filter cartridge for use with a precoat style filter media, and having a device for providing or introducing a soluble compound into the filtered water.

BACKGROUND OF THE INVENTION

This invention deals with a water treatment cartridge of the type disclosed in U.S. Pat. Nos. 4,857,189 and RE 34,031, both of which are incorporated by reference herein. These cartridges disclose a precoat style of filtration where the treated, activated carbon media filters the water, and in so doing adheres to a bag-like, porous filter septum located in the cartridge. As water enters an inlet to the cartridge and proceeds through an inlet passage, it moves through the filter media, then through the septum and out through an outlet stack and an outlet.

It is common to add a phosphate compound to filtered water to reduce scaling caused by hard water. In conventional applications, phosphate addition is accomplished concurrently with filtration by dissolving a solid phosphate compound in a small portion of the water flowing through the water treatment cartridge. The phosphate crystals are held in a feeder tube, and a small portion of the filtered water is fed through the feeder tube, dissolving some of the phosphate crystals. The phosphate-containing water then exits through a bleed hole to the outlet stack, where it is combined with the remainder of the filtered water.

In the prior art, phosphate addition is accomplished by use of a feeder tube that is fed by a portion of the water that has already been filtered. A "flowerpot assembly" is located near the top of the filter cartridge with an opening facing upward so that gravity or turbulence does not pull out filter media in the orifice from the inlet tube. This flowerpot assembly also houses filtering material between the opening and the check valve. A portion of the filtered water flows through a valve in the flowerpot assembly to the feeder tube by means of ABS tubing. The tubing is secured at both ends with a solvent such as methyl ethyl ketone (MEK) to hold the tubing to the outlet of the flowerpot assembly and the inlet of the feeder tube. The tubing is press fit onto a connector on either end and is then secured with a chemical solvent to ensure the connection. A grid screen and compression ring are used to prevent phosphate crystals from plugging the flow path in the bent tube, requiring another solvent bond.

The preferred solvent is MEK. This solvent ensures a physical as well as a sealed connection. Establishing a sealed connection is important because the water must go through the ABS tubing to the feed tube, and must not bypass the flowerpot.

However, the use of a solvent such as MEK creates numerous problems in the manufacture and use of the water treatment cartridges. First of all, the solvent is time consuming to apply manually. Also, during manufacture, time is needed for the adhesive to dry, further elongating the process. Finally, there is a possibility that an MEK-fluidized ABS bubble may form, blocking the flow path in the plastic tube. Parts are fixtured to blow air through to break bubbles that may form. This procedure takes time and materials. Thus, there is a need for a fewer connections which are easier and less time consuming to assemble during manufacture.

Use of the flowerpot assembly and ABS tubing to feed water to the feeder tube requires the use of several components that may be unnecessary. These components, including the flowerpot housing, tubing, grid screen and compression ring must be purchased, warehoused, stocked and available during the manufacturing process. Elimination of these parts would result in a filter cartridge that is less expensive and easier to manufacture.

There is also a disadvantage to the prior art construction once the cartridge is in use. By using the MEK solvent, there is a concern by some that it might enter into the treated water. Since the purpose of water filtration of this type is to clean the water, the possibility of the solvent contaminating the water is a problem. The delivery of water into the feeder tube must be done without the introduction of solvents into the water.

Accordingly, an object of this invention is to provide a new and improved feeder tube for a water filter cartridge that draws untreated water for treatment by a solid compound.

Another object of this invention is to provide an improved feeder tube construction that establishes fluid communication with the filter cartridge that is easier and less time consuming to assemble during manufacture.

Yet another object is to provide an improved filter cartridge requiring no use of chemical solvents.

It is still another object of this invention to provide an improved water filter cartridge that has fewer parts and is less expensive to manufacture.

BRIEF DESCRIPTION OF THE INVENTION

These and other objects are met or exceeded by the present invention which features a feeder tube which draws a desired portion of unfiltered water through a plug assembly for treatment by a solid compound. The plug assembly filters and purifies the water before it is exposed to treatment by the solid compound.

More specifically, the present invention features an improved feeder tube for a water treatment cartridge that provides treatment by a solid compound for a slipstream of untreated water flowing through the cartridge. The feeder tube includes a first end and a second end, such that the slipstream of water generally flows into the feeder tube at the second end and out of the feeder tube at the first end. A bottom plug assembly is in operational relationship with the second end and includes a porous plug being sized and configured to provide filtration and purification for the slipstream portion of the water.

When in operation, the slipstream of untreated water is filtered and purified by the porous plug. It then passes through the valve into the feeder tube where it reacts with the solid compound. The filtered and treated water then exits the feeder tube through the bleed hole. Drawing of untreated water directly into the feeder tube eliminates the need for the tubing, grid screen, compression ring and flowerpot housing of the prior art. Since the filtration system of the water filter cartridge is simpler, it is faster and less costly to manufacture.

Further, the tubing of the prior art was attached to the flowerpot assembly and the feeder tube by solvent bonds. The present invention is faster and easier to produce because there are no connections of this type. When there are no solvent bond connections, there is also no opportunity for MEK-fluidized ABS solvent bubbles to block water flow and no application of special procedures to prevent blockage of water flow. Each of these factors makes the present feeder tube less expensive to produce.

Eliminating the use of MEK solvent also results in cleaner product water. When no solvent is used in making the filter cartridge, there is no opportunity for MEK to leach into the water. Less contamination produces cleaner water as it exits the filter cartridge.

BRIEF DESCRIPTION OF THE DRAWINGS

FIG. 3 is a sectional view of a feeder tube of the present invention; and,

FIG. 4 is a perspective view of the present bottom plug housing and cage.

DETAILED DESCRIPTION OF THE INVENTION

The present invention provides a feeder tube for use in a water treatment cartridge that does not require the use of a flowerpot assembly located near the top, tubing, grid screen, or connecting ring and the associated solvent connections. A feeder tube according to the present invention takes in water that flows through the filter media trapped in a porous plug, then through a valve and into the tube.

Generally, water is treated and filtered with the goal of making it potable. It is to be understood that, in order to be used with water intended for consumption, all chemicals and materials used in the construction of the component parts must comply with requirements of an appropriate agency, such as the Food and Drug Administration. Failure to use such materials will, in many cases, result in a feeder tube or filter cartridge that performs satisfactorily according to the invention, but use of the product water will be limited by applicable water quality regulations.

Figure 1:
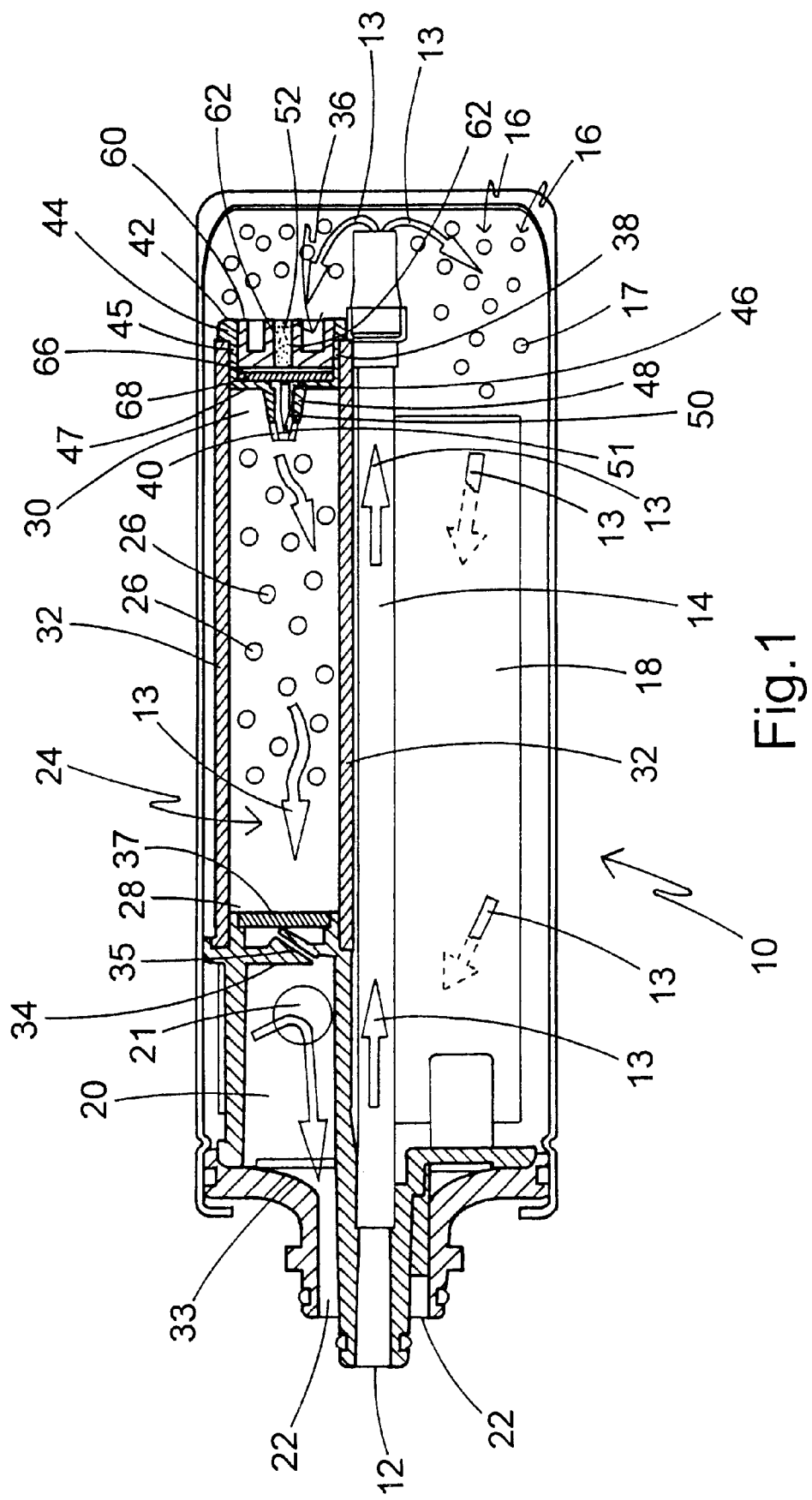
FIG. 1 is a vertical sectional view of a water treatment cartridge suitable for use with the present invention.

Referring now to FIG. 1, a water treatment cartridge, generally designated 10, is shown and a general explanation of the flow of water will be described. The present cartridge 10 is of the type designed for use with a filter head in U.S. Pat. No. 3,746,171 which is incorporated by reference. However the present filtration system is contemplated for use with any filter system.

The water treatment cartridge 10 has an inlet port 12 to an inlet tube 14, where unfiltered water flows into the cartridge 10. The water flows through the cartridge 10 in the direction generally shown by the arrows 13. When the water exits the inlet tube 14, it encounters a filter apparatus, generally designated 16, housed within the water treatment cartridge 10. There are many suitable filter apparatus 16 that are known in the art for filter cartridges of this type. The preferred filter apparatus 16 includes granulated activated carbon, corrugated filter septums, carbon blocks, carbon beds, or radial flow granular carbon beds.

In some instances, two or more filtration methods are combined to produce a more efficient type of the filter apparatus 16. In the most preferred cartridge 10, a media such as carbon mixture 17, is utilized in addition to a corrugated septum 18, together forming the filter apparatus 16. Purification of the water is performed by the carbon mixture 17. The septum 18 is a pleated bag of porous filter material. As water flows through the septum 18, the septum separates the water from the carbon mixture 17, by trapping the carbon mixture the pores on the outside of the bag. This is the process known as precoating.

Precoating of the septum 18 with the carbon mixture 17 is an integral part of the preferred filtration system, ensuring close contact of the water with the particulate carbon before it passes through the septum. The carbon precoat also provides additional filtration, trapping contaminant particles between pieces of the carbon mixture 17 contacting the septum 18. Filtered water then flows from the septum 18 into an outlet stack 20, through a button port 21 that leads to an outlet port 22. In the preferred embodiment, the inlet port 12 and the outlet port 22 are concentric with each other, but other arrangements as contemplated are well known in this art.

When it is desirous to treat a portion of the water flowing through the cartridge 10, the main stream of the water follows the flow path as described above, but a slipstream follows a different path. Instead of flowing through the septum 18 to the outlet stack 20 and the outlet port 22, the slipstream is diverted through a feeder tube, generally designated 24, due to pressure differentials within the filter cartridge 10. A soluble compound 26 is housed within the feeder tube 24 and treats the slipstream as the water passes through the tube. After flowing through the feeder tube 24, the slipstream portion and the main stream portion of water are recombined in the outlet stack 20 before exiting through the outlet port 22.

The feeder tube 24 allows the slipstream portion of the water to react with the solid compound 26. Reaction of the water with the solid compound 26 includes a physical reaction, such as dissolving or leaching a portion of the solid compound into the water, and a chemical reaction, such as neutralization of an acid or base to alter the pH of the water. Water in the slipstream that comes in contact with the solid compound 26 has changed properties compared to the main stream. Many solid compounds 26 are suitable for water treatment. Examples include dissolving of citric acid or phosphates to reduce scale formation, leaching of silver into water to reduce bacterial growth, or treatment with an acid or base to change the pH of the water. A phosphate compound is a commonly used additive to reduce scale and is the preferred solid compound 26. The most preferred solid compound 26 is Tetra Sodium Pyrophosphate Decahydrate (TSPP·$H_2O$). Food grade Tetra Sodium Pyrophosphate Decahydrate, available from Mallinckrodt Chemical Co., Code No. 7956, is the most preferred solid substance because it dissolves quickly and easily forms a saturated solution.

As shown in FIGS. 1 and 3, the feeder tube 24 has a first end 28, a second end 30, and a generally cylindrical wall 32. In between the first end 28 and the second end 30 is disposed a supply of the solid compound 26, preferably in granular or tablet form. The first end 28 is toward a top 33 of the cartridge 10, and is generally the end closer to the button port 21. Also, the first end 28 is in operational relationship with a barrier 34 and a bleed hole or bore 35. A bottom plug assembly, generally designated 36, is located at the second end 30.

The barrier 34, which is preferably integrally formed with the wall 32, prevents water in the slipstream from flowing freely between the feeder tube 24 and the outlet stack 20. Water flow is controlled by the diameter of the bleed hole 35, which is preferably disposed at an oblique angle, a, to the axis of the feeder tube 24, and extended through the barrier 34 between the feeder tube and the outlet stack 20. The barrier 34 may be a part of either the feeder tube 24, the outlet stack 20, or it may be an independent component fitted between them. Any connections between the outlet stack 20, the feeder tube 24 and the barrier 34 preferably are sealed to prevent unfiltered water from entering the slipstream. In the alternative, the outlet stack 20, the barrier 34 and the feeder tube 24 could be made of unitary construction.

Preferably, the feeder tube 24 also has a screen 37 between the solid compound 26 and the bleed hole 35. The screen 37 is preferably a grid screen or filter cloth made of chemically inert materials. Plastics are the preferred materials, with polypropylene monofilament cloth being most preferred. The grid size or porosity of the screen 37 should be small enough to prevent particles of the solid compound 26 from clogging the bleed hole 35, but large enough that the water flow rate through the feeder tube 24 is not reduced. The screen 37 is located anywhere between the bleed hole 35 and the solid compound 26. The exact location of the bleed hole 35 through the barrier 34 is variable. It may be positioned anywhere on the barrier 34 as long as flow of the water in the slipstream is not impaired. The bleed hole 35 is preferably placed at an angle relative to the general direction of water flow through the feeder tube 24. This arrangement not only consumes less space, but it prevents blockage of the bleed hole 35 if the screen 37 is located close to the bleed hole 35 where the excess screen 37 or an accumulation of solid compound 26 may hinder water flow. Preferably, the angle of the bleed hole 35, $\alpha$, is greater than 45°, and most preferably, $50° \leq \alpha \leq 60°$. However, any angle et may be used as long as the bleed hold is not blocked by the screen 37 or the solid compound 26.

Figure 2:
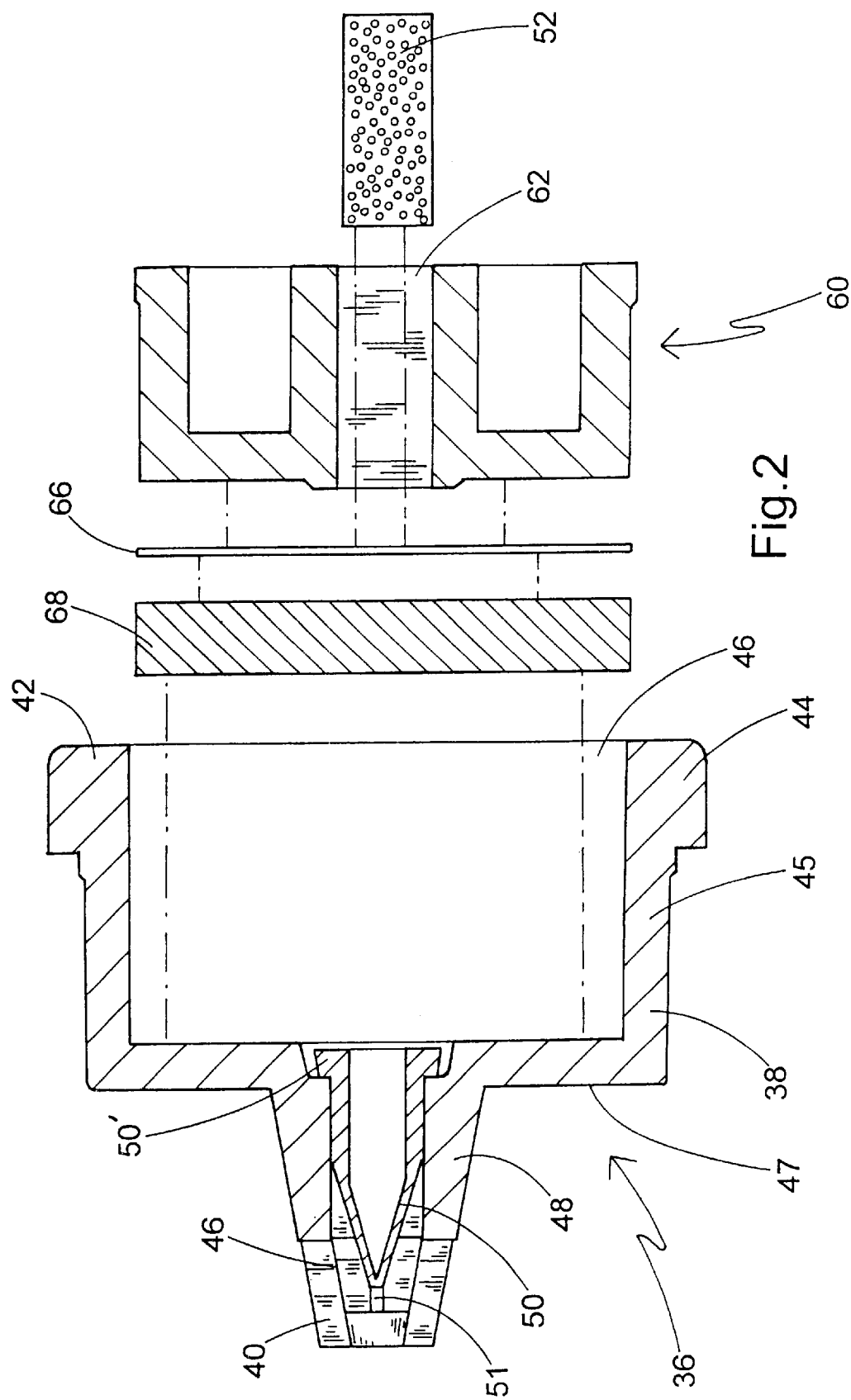
FIG. 2 is an exploded view of the bottom plug assembly.

Turning now to FIGS. 2 and 4, the bottom plug assembly, generally designated 36, has a housing 38 with a top end 40, and a bottom end 42. The bottom plug assembly 36 is in operational relationship with the second end 30 of the feeder tube 24. The phrase "in operational relationship" is intended to mean that the two parts are in direct contact with each other. When the filtered water from the bottom plug assembly 36 flows directly into the feeder tube 24, the solvent bonds holding a connecting apparatus can be eliminated.

The terms top and bottom refer to the preferred operational orientation of the cartridge 10, with the top 33 in the uppermost vertical orientation. At the bottom end 42 is an annular thickened rim 44, a generally cylindrical body portion 45 that connects the rim 44 with a cage 46 at the top end 40. The body 45 should be sized and configured such that, it seals with the second end 30 of the feeder tube 24. The preferred means of sealing the body 45 to feeder tube 24, is welding, such as sonic welding, spin welding, vibration welding, hot-plate welding or by any other means of plastic bonding without solvents. An upper wall 47 of the body portion 48 includes a tapered tabular port 45 which forms a seat for the cage 46. Thus, the body portion 45 is in fluid communication with the cage 46.

The cage 46 protects and encloses a check valve 50. Although any type of check valve 50 may be used, a simple design, such as a flapper valve or a slit that is pushed open by water flow, is preferred. Although a flapper type valve is preferred, the valve 50 is contemplated as being any type known in the art that will open at a very low cracking pressure. A flapper valve is the preferred valve 50 due to its low cost, and ease of manufacture. Other valves, such as ball and spring valves or gasket sealer valves, are also suitable. Preferably, the check valve 50 has a brim 50' that fits in a recess in the upper wall 47 of the body portion 48.

The cage 46 is designed to keep particles of the soluble compound 26 from becoming wedged in the check valve 50, preventing the valve from operating properly. Any design may be used for the cage 46 that will allow water to flow out, but prevent solid compound 26 from entering the valve 50. For example, small, narrow slit-shaped openings 51 in the surface, a screen, or a mesh made of any compatible substance including metal or plastic and the like, are suitable. When the crystals of the preferred compound 26, Tetra Sodium Pyrophosphate Decahydrate are used, openings 51 of approximately 0.020 inch wide have been found to allow water to flow into the feeder tube 24, but prevent solid crystals from flowing out.

Water enters the bottom plug assembly 36 through a porous plug 52 by pressure. If the filter apparatus 16 includes fine particulate carbon mixture 17 in the water, the plug 52 should be made of a coarse material with large pores that will trap the carbon mixture 17 but gravity and turbulence will not dislodge it. The pores also have to be sized so that the plug 52 will not become so packed with carbon mixture 17 that the water cannot flow through. Any porous filter material may be used for plug 52, with carbon, ceramic or plastic, such as polyethylene or polypropylene, being preferred and porous polyethylene being most preferred.

The preferred porous plug 52 will accumulate some amount of carbon mixture 17 in its pores, simulating the coating of carbon mixture 17 on the septum 18 that supplies additional water filtration. Preferred materials for the manufacture of the porous plug 52 include a carbon block, porous ceramic or porous plastic, such as polyethylene or polypropylene, but porous polyethylene is most preferred. However, the choice of material for the porous plug 52 will depend on the filter apparatus 16 and the desired flow rate of the slipstream. The porous plug 52 is sized and configured to fit within the bottom plug assembly 36.

Any means may be used to secure the porous plug 52, but preferably an orifice bushing 60 is provided that is configured to hold the porous plug in place. The orifice bushing 60 is configured to fit inside a cavity as defined by the body portion 45, but also to provide an acceptable flow rate of slipstream water into the feeder tube 24. Use of the orifice bushing 60 allows the size and shape of the porous plug 52 to change without redesigning the entire bottom plug assembly 36. When the porous plug 52 is smaller than the entire cross-section of the bushing 60, the bushing 60 has a chamber 62 to hold the porous plug 52. Water must be able to flow through the porous plug 52, so the chamber 62 is open at both ends of the plug.

Between the orifice bushing 60 and the cage 46, the check valve 50 is positioned to prevent clean, filtered water that has passed through the porous plug 52 from reentering the water outside the feeder tube 24 and allowing water to flow only from the porous plug 52 toward the outlet stack 20. The check valve 50 opens in response to water pressure, allowing the water to flow only into the feed tube 24. When the water flow slows or stops, the valve 50 closes, preventing backflow of water out of the feeder tube 24.

If filtration by the porous plug 52 is insufficient for a given application, additional filtration is supplied by an optional filter membrane 66 and/or filter discs 68 that are placed between the porous plug 52 and the valve 50. Any type of filtration material known in the art is suitable, such as paper, plastic, and the like, and is constrained only by the dimensions of the body portion 45. Generally, the filter discs 68 are very small, making paper filters, porous pads, or carbon blocks the preferred materials. However, where the cost is justified, more complex filter systems are contemplated.

An important feature of the feeder tube 24 is the ability to deliver a constant quality and quantity of treated water from the slipstream. Since the cartridge 10 has no flow control mechanism, these goals are accomplished through equilibrium processes. Quantity and quality of the treated water will be constant if the flow rate is constant and the slipstream has reached chemical equilibrium with the solid component 26. Flow rate is constant if, over the range of pressures at which unfiltered is supplied, flow rate is limited by the size of the bleed hole 35. Treatment quality is steady where chemical equilibrium is achieved, either by dissolving sufficient solid compound 26 to make a saturated solution, or if a chemical reaction is involved, reaching chemical equilibrium of the chemical reaction. Choice of the diameter of the bleed hole 35, the solid compound 26, the temperature, pressure and flow rate of the overall system will affect the quantity and quality of the slipstream water.

Treatment level or quality of the water treated by the cartridge 10 is controlled by providing conditions such that the reaction between the slipstream water and the solid compound 26 proceeds to completion or to chemical equilibrium. A solid compound 26 should be used so that the water is fully treated, that is, it reaches chemical equilibrium, before it flows through the entire length of the feeder tube 24. Of course as the supply or chemical activity of the solid compound 26 is depleted, there will come a time when the slipstream is not fully treated at the exit of the feeder tube. Decrease in the treatment level of the cartridge 10 is an indication that it should be replaced, providing a fresh supply of solid compound 26. The ratio of the water in the slipstream compared to the main water flow desired depends on what level of treatment is desired in the product stream. For a particular feeder, the volume of the slipstream is calculated from the ratio of the treatment level in the slipstream compared to the desired level of treatment in the product water.

The amount of water that flows through the feeder tube 24 is a function of the hydrodynamics of the fluid flow within the filter cartridge 10. Water will flow through the feeder tube 24 at a rate that will equalize the pressure drop for water that flows through the main filter system 24 with the pressure drop of water that flows through the feeder tube. Flow rates through the feeder tube 24 will be affected by the diameter of the bleed hole 35, the size and composition of the porous plug 52, the filter membrane 66 and the filter disc 68, as well as the total pressure differential across the feeder tube 24. From the slipstream size, the minimum cross sectional area of the bleed hole 35 is calculated obtain the desired flow rate at the temperature and pressure inside the feeder tube 24. The dimensions and porosity of the porous plug 52, the porous disc 66 and the filter membrane 68 must also be suitable to permit the desired flow rate of the slipstream given the temperature and pressure within the filter cartridge 10.

EXAMPLE 1

A filter cartridge 10 was constructed to treat water with a phosphate compound. The cartridge 10 was shaped and configured generally as shown in FIG. 1. Addition of phosphates to water is used to reduce scale in downstream units, including icemakers, coffee machines and the like. The main flow of water was treated with MICROPURE® activated carbon mixture 17 (Everpure, Inc., Westmont, Ill.) and a corrugated septum 18. In use, water flow through the septum 18 caused the carbon mixture 17 to coat the septum, and provided a layer of filtration.

A portion of the water flowed into the feeder tube 24 through the bottom plug assembly 36. The housing 38 was made of ABS resin, and had a cross sectional area of approximately 0.43 in$^2$. The sides of the housing were shaped to seal within the walls of the feeder tube 24. At one end of the housing 38 the cone-shaped cage 46 was constructed with four 0.020 inch slits 51 to permit flow of the water through the assembly 36.

Within the assembly 36, an orifice bushing 60, to hold the valve 50, porous plug 52, filter disc 66 and filter membrane 68 in place. The bushing 60 was made of ABS resin. Near the center of the bushing 60 was a circular chamber that held the porous plug 52. The cylindrical porous plug 52 was made of porous polyethylene, approximately 0.31 inches in diameter and 0.388 inches in length. The porous plug 52 had 100 micron pores and 40% pore volume. It was chosen to hold an amount of the carbon mixture 17, simulating performance of the septum filter material 18 when coated with carbon mixture.

Adjacent to the orifice bushing 60 and the porous plug 52 a piece of filter membrane 66 was placed. The filter membrane 66, made of VERSAPOR® 3000, (Gelman Science, Inc., Ann Arbor, Mich.), had length and width the same as the porous disc 68, a thickness of 0.0075 inches and a 3 micron pore size. Between the filter disc 68 and the check valve 50, was a filter disc 68 made of VYON® Roll high molecular weight polyethylene filter material. The disc 68 was 0.846 inches in length, 0.314 inches in width and 0.125 inches in height. The semi-circular ends of the disc 68 had a radius of 0.157 inches. Following filtration, the water passed through the flapper check valve 50 and the bottom plug cage 46 into the feeder tube 24.

The feeder tube 24 contained Tetra Sodium Pyrophosphate Decahydrate crystals as the solid compound 26. Phosphate levels of 1–10 ppm in the product water was desired in order to reduce scale in downstream equipment. A saturated solution of Tetra Sodium Pyrophosphate Decahydrate contained 70,000 ppm of phosphates. Use of the 0.040 inch bleed hole 35 produced product water containing 3 ppm phosphate at a rate of 0.5 to 1 gallon per minute. Flow rate through the feeder tube 24 was estimated to be approximately 0.005% of the total water flow through the filter cartridge 10.

After treatment with the Tetra Sodium Pyrophosphate Decahydrate crystals 26, water exited the feeder tube 24 through the bleed hole having a diameter of 0.040 inches and leading into the outlet stack 20. The first end 28 of the feeder tube 24 was vibration welded to the outlet stack 20, forming a seal between them. The Tetra Sodium Pyrophosphate Decahydrate was held in place with the screen 37, which was made of polypropylene monofilament cloth with a porosity of 90 CFM. Water was allowed to flow from the feeder tube 24 into the outlet stack 20 through the bleed hole 35, which was offset from the longitudinal axis of the feeder tube by approximately 55°. The grid screen 37 prevented blockage of the bleed hole 35.

The above example demonstrates the feasibility of the design of the present invention. Testing showed that varying flow rates from 0.5 to 1 gallon per minute did not cause the phosphate level in the product water to deviate from the desired range, indicating that a saturated solution was produced.

While a particular embodiment of the present proportional flow feeder tube has been shown and described, it will be appreciated by those skilled in the art that changes and modifications may be made thereto without departing from the invention in its broader aspects and as set forth in the following claims.

I claim:

1. An improved feeder tube for a water treatment cartridge that provides treatment by a solid compound for a slipstream of untreated water flowing through said cartridge, said feeder tube comprising:

a first end and a second end, arranged such that the slipstream of water generally flows into said feeder tube at said second end and out of said feeder tube at said first end;

a bottom plug assembly in operational relationship with said second end and including a porous plug being configured to provide filtration and purification for the slipstream portion of the water, wherein said bottom plug assembly comprises a housing with a cage and a valve within said cage, said cage being configured to prevent the solid compound from interfering with operation of said valve while permitting flow of the water.

2. The feeder tube of claim 1 wherein said operational relationship is one of direct attachment.

3. The feeder tube of claim 1, wherein said porous plug is made of material comprising at least one of carbon block, porous ceramic and porous plastic.

4. The feeder tube of claim 3, wherein said porous plastic is polyethylene or polypropylene.

5. The feeder tube of claim 1, wherein said valve is a flapper valve.

6. The feeder tube of claim 1 further comprising an orifice bushing that includes a chamber configured to hold said porous plug, said orifice bushing being sized and configured to be held within said housing.

7. The feeder tube of claim 6, wherein said chamber has a smaller cross sectional area than said orifice bushing.

8. The feeder tube of claim 6, wherein said bottom plug assembly further comprises a porous filter disc.

9. The feeder tube of claim 8, wherein said porous filter disc is made from one or more of paper, porous plastic and porous ceramic materials.

10. An improved water filter cartridge for filtering water and treating a portion of the water with a solid compound therein, comprising:

an inlet tube that carries the water into said filter cartridge;

a filter apparatus housed inside said filter cartridge;

a feeder tube that provides filtration, purification and treatment by said solid compound for a slipstream portion of the water, said feeder tube having a first end and a second end with a bleed hole in operational relationship with said first end and a bottom plug assembly in operational relationship with said second end, said bleed hole being sized and configured to provide an appropriate flow rate of the slipstream, said bottom plug assembly including a porous plug, a housing with a cage and a valve within said cage, said cage being configured to prevent the solid compound from interfering with operation of said valve while permitting flow of the water, said porous plug being sized and configured to be held within said bottom plug assembly and provide filtration and purification for the slipstream portion of the water, such that the slipstream of water is filtered and purified by said porous plug, passes into said feeder tube, reacts with said solid compound, exits said feeder tube through said bleed hole;

an outlet stack recombining the main stream portion of water with the slipstream portion of water; and an outlet port that carries water out of said water treatment cartridge.

11. The filter cartridge of claim 10, wherein said filter apparatus comprises carbon.

12. The filter cartridge of claim 11, wherein said filter apparatus comprises a carbon mixture and a corrugated septum.

13. The filter cartridge of claim 10, wherein said solid compound is a phosphate compound.

14. The filter cartridge of claim 13, wherein said phosphate compound is Tetra Sodium Pyrophosphate Decahydrate.

15. The filter cartridge of claim 10, wherein the cross section and depth of said porous plug are sized to simulate the filter apparatus.

16. The filter cartridge of claim 10, wherein said valve is a flapper valve.

17. The filter cartridge of claim 10 further comprising an orifice bushing that includes a chamber configured to hold said porous plug, said orifice bushing being sized and configured to be held within said housing.

18. The filter cartridge of claim 17, wherein said bottom plug assembly further comprising a porous filter disc.

19. The filter cartridge claim 10, wherein said bleed hole exits said feeder tube at an angle from the longitudinal axis of said feeder tube that is greater than 45°.

20. An improved water filter cartridge for filtering water and treating a portion of the water with a solid compound therein, comprising:

an inlet tube that carries water into said cartridge;

a filter media housed inside said filter cartridge, providing filtration and purification for a main stream portion of the water;

a feeder tube that provides filtration, purification and treatment by a solid compound for a slipstream portion of the water, said feeder tube having a first end and a second end, with a bleed hole at said first end and a bottom plug assembly at said second end, said bottom plug assembly comprising a porous plug, an orifice bushing that holds said porous plug in place, a porous filter disc, a flapper valve and a flapper cage; said porous plug being configured to remove the filter media from the slipstream portion of the water; said flapper cage being configured to prevent particles of said soluble compound from interfering with operation of said flapper valve while permitting flow of the water; such that the slipstream of water enters said feed tube, is filtered by said porous plug, is filtered by said porous filter disc, passes through said flapper valve into said feeder tube, is treated by the solid compound and exits said feeder tube through said bleed hole;

an outlet stack recombining the main stream portion of water with the slipstream portion of water; and an outlet that carries water out of said water treatment cartridge.

* * * * *